May 12, 1970  3,511,557

ANAMORPHOTIC ATTACHMENT

Filed March 15, 1968

Kurt Kirchhoff
Kurt Lindstedt
*Inventors.*

By Karl F. Ross
*Attorney*

United States Patent Office 3,511,557
Patented May 12, 1970

3,511,557
ANAMORPHOTIC ATTACHMENT
Kurt Lindstedt, Gottingen-Weende, and Kurt Kirchhoff, Hamburg-Lurup, Germany, assignors to ISCO Optische Werke G.m.b.H., Gottingen, Germany, a corporation of Germany
Filed Mar. 15, 1968, Ser. No. 713,467
Claims priority, application Germany, Mar. 30, 1967, J 33,333
Int. Cl. G02b 13/08
U.S. Cl. 350—181          4 Claims

ABSTRACT OF THE DISCLOSURE

An anamorphotic attachment with a pair of oppositely refractive cylindrical doublets each including a low-power cemented surface which is of positive refractivity in the case of the first, negative doublet and of negative refractivity in the case of the second, positive doublet, the two doublets together constituting an afocal system.

Our present invention relates to an anamorphotic attachment of the type comprising a pair of cylindrically curved lens members of opposite refractivity constituting an afocal group within their optically effective plane, i.e. the plane perpendicular to the cylinder axis. Such systems are used, for example, in the taking of wide-angle motion pictures and in their subsequent projection upon a wide screen; they may also be utilized for the photographing of panoramic still pictures on film of normal size and for subsequent reproduction thereof on outsized postcards or the like.

The general object of this invention is to provide an anamorphotic attachment of this description which, when fitted onto an associated spherically effective objective, enables the taking or the projection of pictures with contraction or expansion in a predetermined (usually horizontal) plane and with substantial reduction of the distortion heretofore encountered in systems of this character.

A more particular object of our invention is to provide an anamorphotic attachment adapted to increase the field angle on the object side (i.e. the side of the longer light rays) to a value of approximately 60°, as compared with the usual angle of about 39° in the case of conventional objectives having a focal length on the order of 50 mm.

It is also an object of the instant invention to provide an attachment of this type which is of limited axial length and which can be conveniently fitted in a camera between the basic objective and an axially adjustable front lens or lens combination serving for focusing purposes.

Especially when taking still pictures, which are subject to more detailed scrutiny than movie pictures, the need has arisen for reducing the distortion of conventional anamorphotic components which may be as high as 25%. We have found, in accordance with the present invention, that a reduction of this distortion down to about 8% can be realized, with an anamorphotic factor of approximately 1.5, by the use of an anamorphotic attachment whose conjugate cylindrically effective lens members are doublets each with a preferably forwardly curved cemented surface of low power as compared with the refractive powers of the outer surfaces of each doublet; more particularly, the front doublet may be biconcave, with a front surface more strongly refracting than its rear surface, while the rear doublet may be biconvex, with a more strongly refracting rear surface as compared with its front surface. The refractivity of the cemented surface of each doublet should have a refractive power of a sign opposite that of the overall refractivity of the doublet, i.e. this surface should be positively refracting in the case of the front doublet and negatively refracting in the case of the rear doublet.

Figure 1:
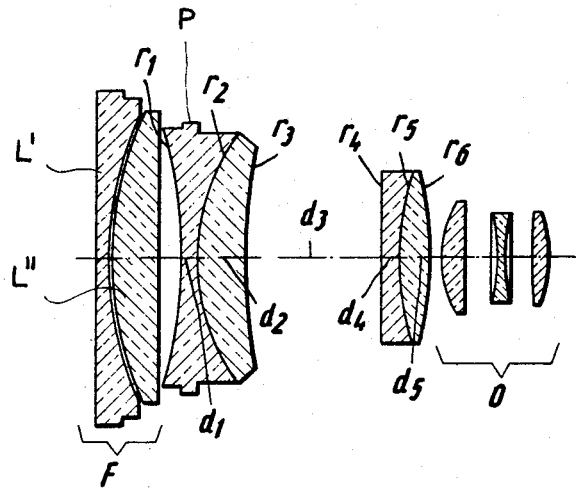
Figure 2:
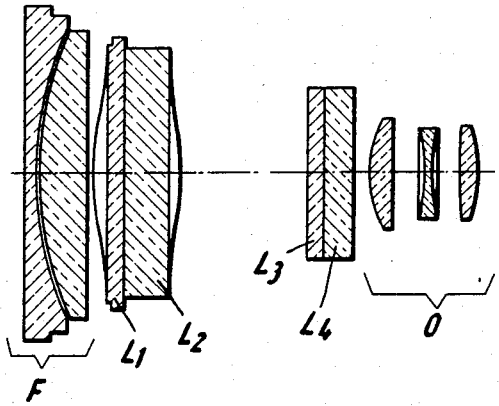

The invention will be described in greater detail hereinafter with reference to the accompanying drawing in which:

FIG. 1 is a horizontal section of an optical system including an anamorphotic attachment according to the invention; and FIG. 2 shows the same system in vertical section.

The objective system shown in the drawing comprises a substantially afocal front group F consisting of two spherical lenses L' and L'', shown as a planoconcave and a planoconvex singlet separated by a small air gap. Also shown is a spherically effective objective O illustrated as consisting of three air-spaced lens members, it being understood that the specific construction of this objective is immaterial for the purposes of the present invention.

Interposed between front group F and basic objective O is an anamorphotic group consisting of a first cylindrically effective doublet $L_1$, $L_2$ and a second cylindrically effective doublet $L_3$, $L_4$, the axes of curvature of these members being assumed to be vertical. Lens $L_1$ is biconcave and has radii $r_1$, $r_2$ and thickness $d_1$; lens $L_2$ is a positive meniscus with radii $r_2$, $r_3$ and thickness $d_2$. Lens $L_3$, which is a negative meniscus, has radii $r_4$, $r_5$ and thickness $d_4$, while biconvex lens $L_4$ has radii $r_5$, $r_6$ and thickness $d_5$. The air space separating the two doublets has been designated $d_3$. Lens $L_1$ is shown formed with a peripheral flange P by which it may be retained in a holder, not shown, which removably secures the anamorphotic group $L_1$–$L_4$ and the front component F to the housing of objective O.

The refractive indices $n_d$ of the inner lenses $L_2$ and $L_3$ are but slightly larger than those of the associated outer lenses $L_1$ and $L_4$ so that cemented surface $r_2$ is of low positive power while cemented surface $r_5$ is of low negative power. The lenses $L_1$, $L_4$ of lower refractive index have a dispersion ratio $\nu$ substantially greater than that of lenses $L_2$, $L_3$.

In the following tables we list specific numerical values for the parameters $r_1$–$r_6$ and $d_1$–$d_5$ of the illustrated system, as well as for the indices of refraction $n_d$ and the dispersion ratios $\nu$ of lenses $L_1$–$L_4$, together with the individual powers $\Delta n/r$ of the several cylindrical surfaces thereof. Subject to the maintenance of conjugacy (i.e. afocality in the plane of FIG. 1) and the requirement that the sign of the refractive power of each cemented surface $r_2$, $r_5$ should remain unchanged, the tabulated values may vary within tolerances of ±20% for the radii $r_1$–$r_6$, the thicknesses and separations $d_1$–$d_5$ and the surface powers $\Delta n/r$, the tolerances for $n_d$ being ±0.02 and those for the Abbé numbers being ±5; in view of these tolerances, some of the decimals listed in the table for the sake of completeness are considered insignificant both for the preferred system and for the range of tolerances based thereon.

TABLE I

| Lens | Radii | Thicknesses and Separations | $n_d$ | $\nu$ | $\Delta n/r$ |
|---|---|---|---|---|---|
| $L_1$ | $r_1=-1.7360$ | $d_1=0.060$ | 1.62286 | 60.0 | $-0.35879$ |
| | $r_2=+0.7107$ | | | | $+0.00172$ |
| $L_2$ | $r_3=+2.4604$ | $d_2=0.170$ | 1.62408 | 36.1 | $-0.25365$ |
| | | $d_3=0.491$ | Air Space | | |
| | $r_4=+7.6720$ | | | | $+0.08135$ |
| $L_3$ | $r_5=+1.1320$ | $d_4=0.066$ | 1.62408 | 36.1 | $-0.00108$ |
| $L_4$ | $r_6=-1.7120$ | $d_5=0.116$ | 1.62286 | 60.0 | $+0.36382$ |

The focal length of the basic objective O, considered equal to unity in the foregoing example, may in practice have a magntiude of 50 mm. Owing to the anamorphotic effect, which contracts the projected image (for light rays passing from left to right) by a factor of about 1.5 in the horizontal plane, the apparent focal length of the system in this plane is reduced to about 0.7 linear unit or approximately 35 mm.

The objective O may have the construction described in our copending application Ser. No. 713,468 of even date (docket No. 5662). This also applies to lenses L', L".

An alternative set of values for the parameters of the system shown in the drawing is as follows:

TABLE II

| Lens | Radii | Thicknesses and Separations | $n_d$ | $\nu$ | $\Delta n/r$ |
|---|---|---|---|---|---|
| $L_1$ | $r_1=-1.6563$ | $d_1=0.0572$ | 1.62286 | 60.0 | $-0.376051$ |
| | $r_2=+0.6781$ | | | | $+0.001799$ |
| $L_2$ | $r_3=+2.3475$ | $d_2=0.1622$ | 1.62408 | 36.1 | $-0.265850$ |
| | | $d_3=0.4688$ | Air Space | | |
| | $r_4=+7.3771$ | | | | $+0.084597$ |
| $L_3$ | $r_5=-1.0800$ | $d_4=0.0630$ | 1.62408 | 36.1 | $-0.001130$ |
| $L_4$ | $r_6=-1.6334$ | $d_5=0.1107$ | 1.62408 | 60.0 | $+0.381323$ |

We claim:

1. An anamorphotic attachment for a spherically effective optical objective, comprising a cylindrically curved front doublet and a cylindrically curved rear doublet having parallel axes of curvature, said front and rear doublets together forming an afocal group in a plane perpendicular to said axes, said front doublet consisting of a biconcave first lens of lower refractive index and higher dispersion ratio and a meniscus-shaped second lens of higher refractive index and lower dispersion ratio, said rear doublet consisting of a meniscus-shaped third lens of higher refractive index and lower dispersion ratio and a biconvex fourth lens of lower refractive index and higher dispersion ratio, said first lens $L_1$, said second lens $L_2$, said third lens $L_3$ and said fourth lens $L_4$ having radii $r_1$ to $r_6$ and thicknesses and separations $d_1$ to $d_5$ whose numerical values, based upon a numerical value of unity for the focal length of the associated objective, together with the numerical values of their refractive indices $n_d$ and their Abbé numbers $\nu$, are substantially as given in the following table, with tolerances of ±20% for the radii, thicknesses and separations, of ±0.02 for the refractive indices, and of ±5 for the Abbé numbers:

| Lens | Radii | Thicknesses and Separations | $n_d$ | $\nu$ |
|---|---|---|---|---|
| $L_1$ | $r_1=-1.74$ | $d_1=0.06$ | 1.62 | 60 |
| | $r_2=+0.71$ | | | |
| $L_2$ | $r_3=+2.46$ | $d_2=0.17$ | 1.62 | 36 |
| | | $d_3=0.49$ | Air Space | |
| | $r_4=+7.67$ | | | |
| $L_3$ | $r_5=+1.13$ | $d_4=0.07$ | 1.62 | 36 |
| $L_4$ | $r_6=-1.71$ | $d_5=0.12$ | 1.62 | 60 |

2. An attachment as defined in claim 1, further comprising a substantially afocal pair of spherically effective lenses of opposite refractivity disposed forwardly of said doublets, at least one of said spherically effective lenses being axially displaceable for focusing the associated objective.

3. An anamorphotic attachment for a spherically effective optical objective, comprising a cylindrically curved front doublet and a cylindrically curved rear doublet having parallel axes of curvature, said front and rear doublets together forming an afocal group in a plane perpendicular to said axes, said front doublet consisting of a biconcave first lens of lower refractive index and higher dispersion ratio and a meniscus-shaped second lens of higher refractive index and lower dispersion ratio, said rear doublet consisting of a meniscus-shaped third lens of higher refractive index and lower dispersion ratio and a biconvex fourth lens of lower refractive index and higher dispersion ratio, said first lens $L_1$, said second lens $L_2$, said third lens $L_3$ and said fourth lens $L_4$ having radii $r_1$ to $r_6$ and thicknesses and separations $d_1$ to $d_5$ whose numerical values, based upon a numerical value of unity for the focal length of the associated objective, together with the numerical values of their refractive indices $n_d$ and their Abbé numbers $\nu$, are substantially as given in the following table, with tolerances of ±20% for the radii, thicknesses and separations, of ±0.02 for the refractive indices, and of ±5 for the Abbé numbers:

| Lens | Radii | Thicknesses and Separations | $n_d$ | $\nu$ |
|---|---|---|---|---|
| $L_1$ | $r_1=-1.66$ | $d_1=0.06$ | 1.62 | 60 |
| | $r_2=+0.68$ | | | |
| $L_2$ | $r_3=+2.35$ | $d_2=0.16$ | 1.62 | 36 |
| | | $d_3=0.47$ | Air Space | |
| | $r_4=+7.38$ | | | |
| $L_3$ | $r_5=-1.08$ | $d_4=0.06$ | 1.62 | 36 |
| $L_4$ | $r_6=-1.63$ | $d_5=0.11$ | 1.62 | 60 |

4. An attachment as defined in claim 3, further comprising a substantially afocal pair of spherically effective lenses of opposite refractivity disposed forwardly of said doublets, at least one of said spherically effective lenses being axially displaceable for focusing the associated objective.

References Cited

UNITED STATES PATENTS 1,962,892  6/1934  Chretien _____ 350—181
2,956,475  10/1960  Harris et al. _____ 350—181

FOREIGN PATENTS 739,113  10/1955  Great Britain.
1,082,780  6/1954  France.

DAVID SCHONBERG, Primary Examiner

M. J. TOKAR, Assistant Examiner